(12) United States Patent
Clarke

(10) Patent No.: US 6,779,299 B2
(45) Date of Patent: Aug. 24, 2004

(54) PLANT GROWING SYSTEM

(75) Inventor: Timothy John Clarke, Richmond (CA)

(73) Assignee: 3921107 Canada Inc., Richmond (CA)

( * ) Notice: Subject to any disclaimer, the term of this patent is extended or adjusted under 35 U.S.C. 154(b) by 0 days.

(21) Appl. No.: 10/251,587

(22) Filed: Sep. 20, 2002

(65) Prior Publication Data

US 2003/0115795 A1 Jun. 26, 2003

(30) Foreign Application Priority Data

Dec. 21, 2001 (CA) .............................................. 2365810

(51) Int. Cl.⁷ .............................................. A01G 31/00
(52) U.S. Cl. ........................... 47/62 R; 47/59 R; 47/60; 47/62 E
(58) Field of Search .............................. 47/60, 59, 61, 47/62 R, 62 C, 62 E, 63, 79, 18, 48.5, 67, 64, 80, 81

(56) References Cited

U.S. PATENT DOCUMENTS

| | | | |
|---|---|---|---|
| 2,491,271 A | * 12/1949 | King | |
| 2,639,549 A | 5/1953 | Wubben et al. | |
| 3,007,282 A | * 11/1961 | Galesky | |
| 3,660,933 A | 5/1972 | Wong, Jr. | |
| 3,744,183 A | 7/1973 | Kato | |
| 3,823,508 A | * 7/1974 | Takehara | 47/1.2 |
| 4,037,362 A | 7/1977 | Finck | |
| 4,235,561 A | * 11/1980 | Peterson | 405/45 |
| 4,294,037 A | * 10/1981 | Mosse et al. | 47/59 |
| 4,403,446 A | 9/1983 | Wolfe et al. | |
| 4,467,561 A | 8/1984 | Tsuchiya | |
| 4,607,454 A | 8/1986 | Koike | |
| 4,887,386 A | * 12/1989 | Minshull | 47/48.5 |
| 4,926,585 A | * 5/1990 | Dreschel | 47/64 |
| 4,937,973 A | 7/1990 | Schilling | |
| 5,009,029 A | * 4/1991 | Wittlin | 47/62 |
| 5,409,510 A | * 4/1995 | Houweling | 47/58 |
| 5,425,198 A | * 6/1995 | Coy | 47/18 |
| 5,581,936 A | * 12/1996 | Belgiorno | 47/66 |
| 5,983,562 A | 11/1999 | Lai | |
| 6,082,044 A | 7/2000 | Sherfield | |
| 6,138,403 A | * 10/2000 | Bartlett | 47/18 |
| 6,243,985 B1 | * 6/2001 | Miller | 47/39 |

FOREIGN PATENT DOCUMENTS

| | | | | |
|---|---|---|---|---|
| JP | 404004825 A | * 1/1992 | ........ | A01G/31/00 |
| JP | 405344826 A | * 12/1993 | ........ | A01G/9/00 |
| JP | 406189640 A | * 7/1994 | ........ | A01G/31/00 |
| WO | WO008900001 A1 | * 1/1989 | ........ | A01G/31/06 |
| WO | WO 97 43896 | 11/1997 | | |

* cited by examiner

Primary Examiner—Peter M. Poon
Assistant Examiner—Andrea M. Valenti
(74) Attorney, Agent, or Firm—Blakely, Sokoloff, Taylor & Zafman LLP

(57) ABSTRACT

The invention relates to a plant growing system having a plurality of interconnected and elongated members for supporting growing plants. The system is preferably integrated with an irrigation system to provide a complete hydroponics system.

27 Claims, 8 Drawing Sheets

PLANT GROWING SYSTEM

RELATED APPLICATION

The present application claims the benefit of the filing date of Canadian application no. 2,365,810, filed Dec. 21, 2001.

FIELD OF THE INVENTION

The invention relates to a plant growing system having a plurality of interconnected and elongated members for supporting growing plants. The system is preferably integrated with an irrigation system to provide a complete hydroponics system.

BACKGROUND OF THE INVENTION

Hydroponic growing systems are well known in agriculture as effective growing systems. Generally, in a hydroponic system, growing plants are supported on a soil-less media and a nutrient solution is circulated through the media to provide both nutrients and water to the growing plant. The main advantage of a closed hydroponics system over traditional soil-based (irrigation) agriculture is that approximately 95% of the water which would otherwise normally be lost to the ground through permeation or to the atmosphere through evaporation can be retained within the system. As a result, growing plants often only require 5% or less of the water that would otherwise normally be required to grow viable plants.

In addition to the decreased water usage, hydroponic systems also address other problems associated with traditional irrigation agriculture including soil salination and over-use of fertilizers.

Soil salination due to over-irrigation has recently become a significant problem in the first world in areas such as California. This problem is generally caused by decades of irrigated water leaving salt and other mineral deposits in soil, which eventually accumulate to the point that crops cannot be economically grown in that soil.

Leaching of fertilizer into the environment is also a significant problem where fertilizers that have been applied to agricultural fields are washed into the stream and river systems with the result that aquatic life in the rivers is severely affected. As an example, fertilizer pollution originating from the Mississippi catch basin has resulted in an extensive dead zone (over 500 square miles in size) at the mouth of the Mississippi. In other areas, such as the east coast of Australia, large swaths of coral reef have been affected in a similar manner.

While significant problems have emerged and will continue to emerge with commercial agriculture in valuable growing regions, in many regions of the world (both first world and developing world) water supply, water quality and soil quality prevent effective agriculture. While hydroponic systems can and have been successfully deployed around the world, one of the biggest obstacles to widespread deployment has been the cost of the systems. In many instances, the cost has been a function of the design of these past systems where either of the capital or operating costs of the systems have prevented widespread deployment. For example, past systems using various support media including mineral wool (rock wool) or perforated styrofoam mediums require ongoing or regular replacement of the support media after each or a limited number of harvests. In addition, the cost associated with purchasing, transporting and disposing these media can be prohibitively expensive to many growers. Further still, such systems are disadvantaged as a result of the substantial energy and environmental costs which may be associated with the production and use of these media.

Other media, such as lava rocks or pebbles are heavy and while not presenting the same disposal problems are expensive to transport and are often affected by silting problems during use within the flooding system.

As a result, there has been a need for a hydroponic system that overcomes the problems of past systems by providing an effective support media that is economically efficient in terms of capital and operating costs while further providing a highly effective support media for growing plants. Moreover, there has been a need for a system that is environmentally superior to past systems both in terms of disposal of support media and the ability to recycle the support media. In particular, there has been a need for a system having a light weight support media that enables straightforward growth and harvesting of plants and that additionally enables the system to be efficiently readied for a new crop while continuing to have the water consumption benefits of past hydroponic systems.

A review of the prior art reveals that such a system has not been developed. For example, U.S. Pat. No. 2,639,549, U.S. Pat. No. 3,744,183, U.S. Pat. No. 4,403,446, U.S. Pat. No. 4,937, U.S. Pat. No. 4,037,362, U.S. Pat. No. 3,660,933, U.S. Pat. No. 4,467,561, U.S. Pat. No. 4,607,454, U.S. Pat. No. 5,983,562, U.S. Pat. No. 6,082,044 each disclose hydroponic systems but do not address the problems solved by the present invention.

SUMMARY OF THE INVENTION

In accordance with the invention, there is provided a plant growing system comprising:

a set of elongated members for supporting a growing plant wherein the spacing between elongated members allows passage of a nutrient solution around the elongated members.

In accordance with another embodiment, the system further comprises a corresponding second set of elongated members, the first and second sets of elongated members for supporting a growing plant wherein the spacing between elongated members allows passage of a nutrient solution around interconnected elongated members.

In one embodiment, the system includes a frame for supporting the first and second sets of elongated members which preferably includes openings for telescopically receiving individual elongated members of the first set of elongated members. The openings may be inwardly tapered to facilitate assembly of the elongated members within the frame and the elongated members may have a stop system to prevent removal of the elongated members from the frame after assembly.

The elongated members preferably have a circular cross section although any cross-sectional profile that allows elongated members to interconnect, allow the nutrient solution to circulate between or within the members and to support a growing plant may be utilized. The elongated members may also have a textured surface for retaining water. The elongated members may also be hollow and may be telescopically received in one another.

The plant growing system is preferably integrated into a hydroponics growing system, having an irrigation system for supporting and flooding the elongated members with the nutrient solution. In one embodiment, the irrigation system includes one or more pipes, each having at least one opening for allowing light access to a growing plant on the elongated members.

The elongated members may be any material suitable for growing a plant including plastics and metals. It is preferred that the elongated members are opaque to prevent light penetration to the root system of a plant.

The invention also provides a method of growing and harvesting plants comprising:

placing a seed or a plant on first and seconds sets of interconnected elongated members;

circulating a nutrient solution through the interconnected elongated members to promote plant growth; and, opening the first and second sets of interconnected elongated members to remove grown plant material from the elongated members.

BRIEF DESCRIPTION OF THE DRAWINGS

The invention is described by the following description and the drawings wherein.

DETAILED DESCRIPTION OF THE INVENTION

With reference to the Figures, a hydroponic growing system is described. The system generally includes a plant support system (PSS) 10 for supporting a growing plant within a containment system that can be flooded with nutrient rich water.

Figure 1:
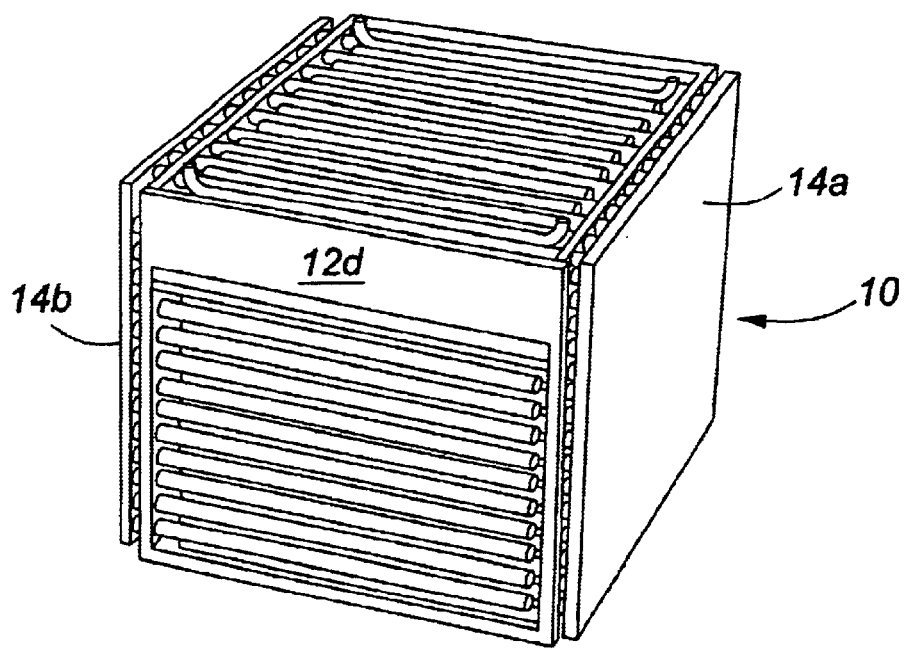
FIG. 1 is perspective view of a plant support system (PSS) in accordance with one embodiment of the invention shown in a closed position.
Figure 1A:
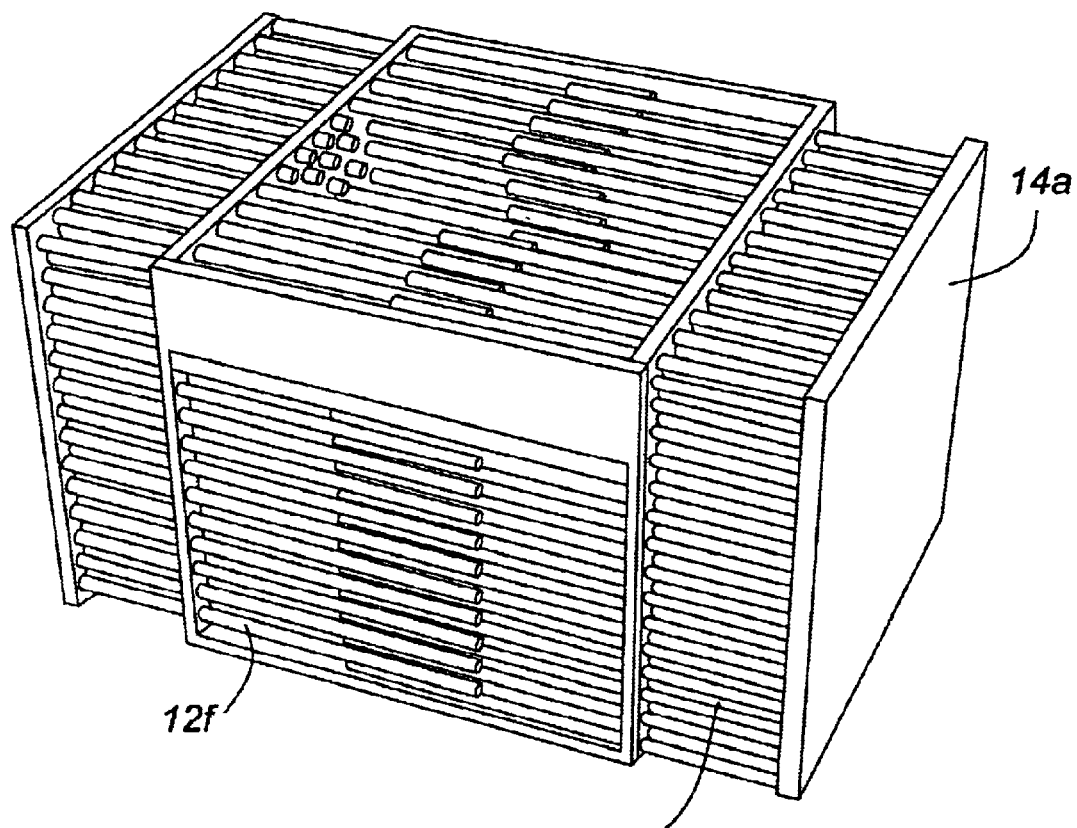
FIG. 1A is perspective view of a PSS in accordance with one embodiment of the invention shown in a partially opened position.
Figure 1B:
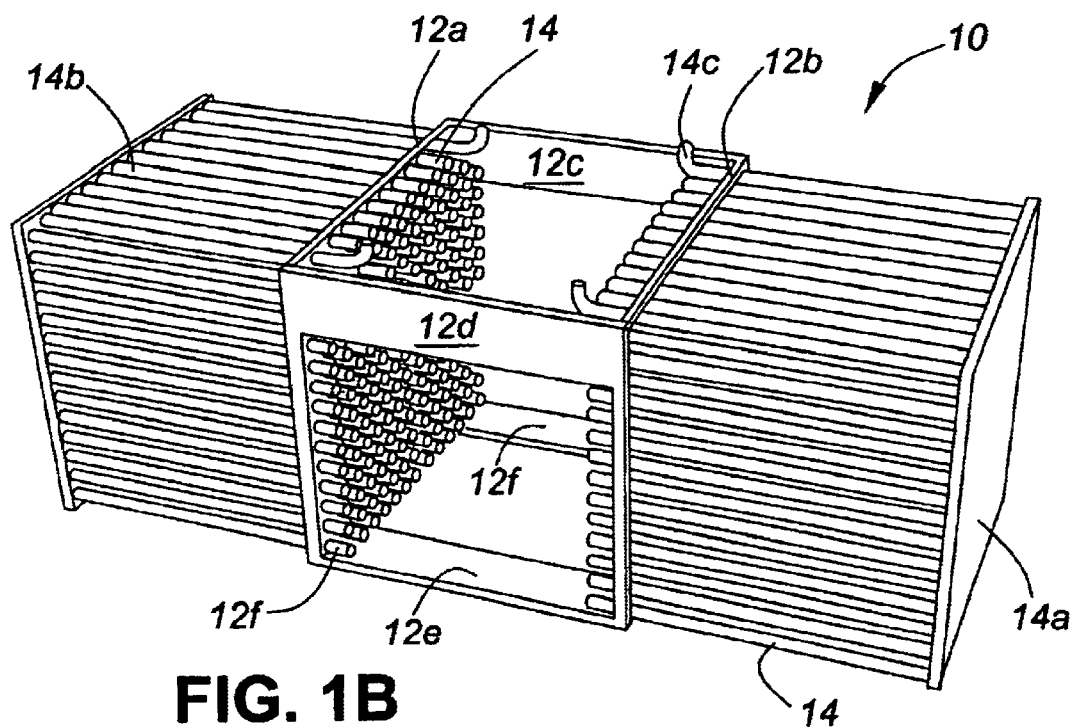
FIG. 1B is perspective view of a PSS in accordance with one embodiment of the invention shown in an open position and showing a stop nib.
Figure 1C:
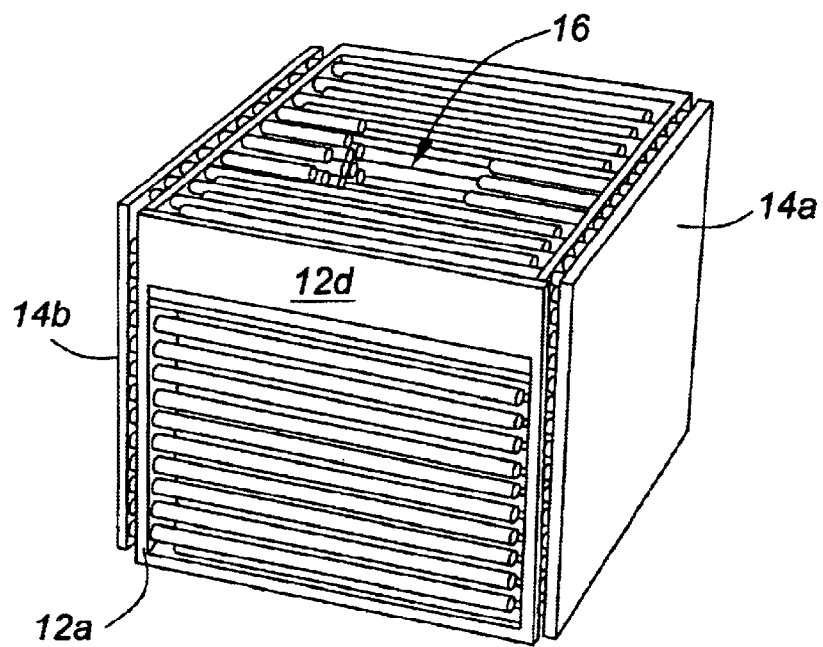
FIG. 1C is perspective view of a PSS in accordance with one embodiment of the invention shown in a closed position and showing a recess for a seed or a plant.

With reference to FIGS. 1–1C, the PSS 10 includes a plurality of elongated members (defined as a member generally having a length greater than its width) 14 mounted to a plate 14a. It is preferred that the elongated members 14 are operatively retained within a plurality of corresponding elongated members on a corresponding plate 14b for supporting a growing seed and plant. It is also preferred that the PSS includes a frame 12 for supporting the elongated members although both a second set of elongated members or the frame are essential to the invention. The elongated members 14 may be separated from one another (either through inherent flexibility of the elongated members or by withdrawing two sets of interconnected elongated members from each other) to enable removal of a plant and its root system from the PSS. As a result, the PSS acts as a mechanical soil, creating a reusable system for plant growth.

Figure 3:
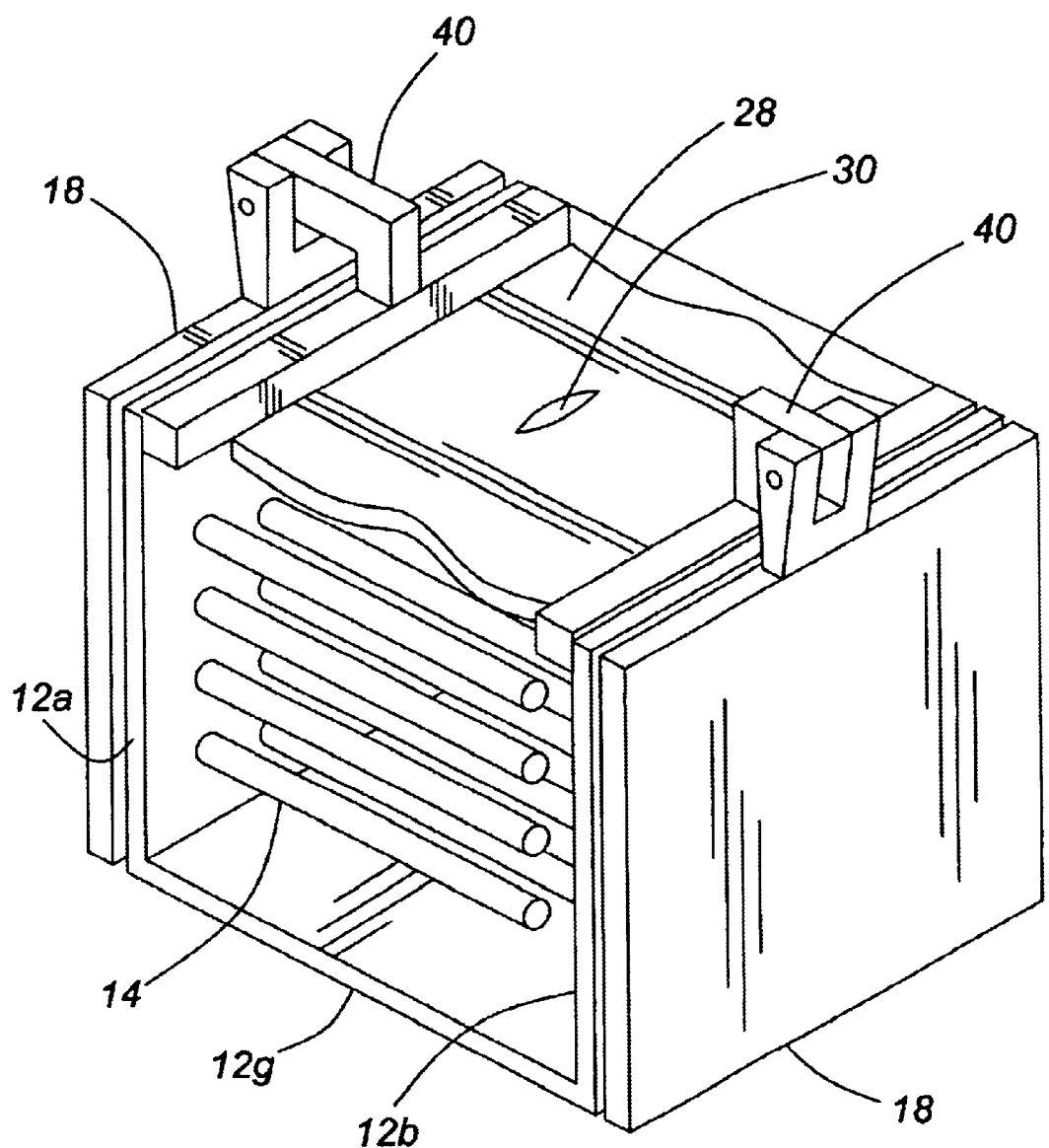
FIG. 3 is a perspective view of a PSS in accordance with another embodiment of the invention showing an alternate containment system.
Figure 3A:
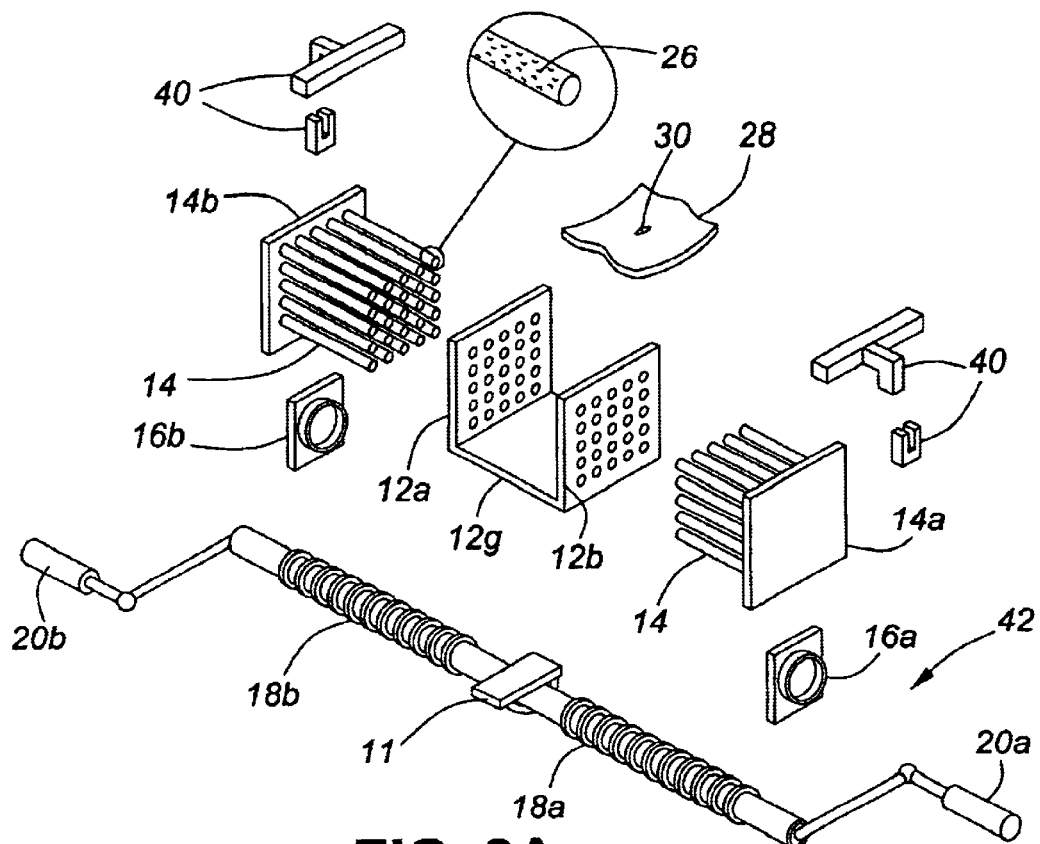
FIG. 3A is an exploded perspective view of a PSS in accordance with a further embodiment of the invention.

As indicated, in a preferred embodiment, the PSS 10 includes a frame 12. The frame 12 includes two opposite frame walls 12a, 12b each having a plurality of openings 12f for receiving the elongated members 14. The frame walls 12a, 12b are connected by connection members 12c, 12d, 12e, 12f to ensure appropriate alignment between the openings on the opposite frame walls. The frame walls 12a, 12b may be connected by members 12c, 12d, 12e, 12f, through a single connection member 12g as shown in FIG. 3A or a combination thereof. The frame is open so as to permit the passage of nutrient solution between the elongated members. The PSS 10 may be any suitable size or shape for supporting one or more specific plants. As shown in FIGS. 1–1C, the PSS is generally a cube-shape but may be other shapes as shown for example in FIG. 3C. Other shapes or profiles may be also be utilized.

Figure 1D:
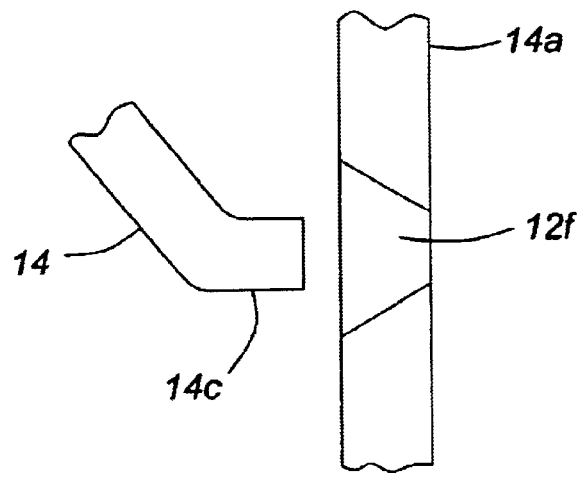
FIG. 1D is a schematic cross section of a plate in accordance with one embodiment of the invention showing showing a conical opening for receiving a elongated member.

As best shown in FIGS. 1A and 1B, the elongated members 14 are attached to and protrude from plates 14a, 14b in a parallel fashion which would allow for the removal and entry of the elongated members from the PSS and are configured to allow alignment and passage through openings 12f. In a preferred embodiment, the openings 12f have a conical profile (FIG. 1D) on the outer surface of opposite frame walls 12a, 12b to enhance alignment of the plurality of elongated members 14 within the plurality of openings during assembly. In addition, and as shown in FIGS. 1B and 1D, a number of elongated members may be provided with a stop system 14c to prevent removal of the elongated members 14 from the openings 12f after assembly. In the embodiment shown in FIGS. 1B and 1D, the stop system includes a number of upwardly curved elongated members which prevent removal of the elongated members from the openings without lifting the plate 14a. This particular embodiment enables removal of the elongated members from the system if desired, but unless and upward lifting force is applied to the plate will prevent the elongated members from being removed. Other embodiments of a stop system may include plugs or other suitable caps to one or more elongated members applied after assembly of the elongated members within the openings 12f.

As shown in FIGS. 1 and 1A, the elongated members overlap with the elongated members 14 on the opposite plate so as to create an overlapping matrix of elongated members. In the overlapping position, it is preferred that the elongated members are approximately 1–5 mm apart so to fully permit water/nutrient solution percolation and sufficient room for roots to grow. Withdrawal of the plates 14a, 14b from the frame, as shown in FIG. 1B, cause the elongated members to slide past one another so as to dislodge the root system of a growing plant from the elongated members. Any plant debris not dislodged from the elongated members is however scraped from the elongated members as the elongated members pass outwardly through the openings. As a result, effectively most plant material can be readily removed from the PSS enabling the PSS to be quickly and efficiently cleaned (and sterilized if necessary) or otherwise prepared for a new plant.

In a further embodiment, and in particular where a frame is not utilized, the spacing between adjacent elongated members, in one or more sections of the plates 14a, 14b may be reduced so that the elongated members in that section physically touch one another when the two plates are made to engage with one another. For example, the spacing between three or four elongated members on one plate could be reduced such that a elongated member on the opposing plate physically touches the other elongated members in order to frictionally engage the two systems of elongated members together.

The cross-sectional profile of the elongated members can be any profile which can be interconnected with respect to one another or through openings having a substantially corresponding profile. Generally, it is preferred that the size of the elongated members relative to the openings provide sufficient clearance so as to avoid excessive frictional binding of the elongated members within the openings, to prevent debris from clogging the openings and to remove root material from the elongated members.

Furthermore, a number of elongated members along the top surface of the PSS 10 may be shortened so as to provide a small recess 16 as shown in FIG. 1C to receive a seed or plant or to permit nesting of PSSs of different dimensions with one another.

In a further embodiment, a single set of elongated members 14 may be utilized to support a growing plant. In this embodiment, the clearance between elongated members may be reduced and may be detachable from the plate to assist in the removal of plant material. In addition, and preferably, the single set of elongated members may pass through a single sided frame or be sufficiently flexible to enable removal of plant material.

The elongated members 14 and frame 12 are fabricated from any suitable material capable of supporting a growing plant. These materials may include injection molded plastic including polyethylene and polypropylene, acrylic, or any other material capable of the operating environment of the system. Other materials may be utilized but it is preferred that light weight materials be used to reduce the weight of the PSS. It is also preferred that the elongated members are opaque (preferably black) so as to prevent light from reaching the growing root system of a plant and hampering growth. A typical dimension of the elongated members is $\frac{3}{8}$" diameter. In addition, the elongated members may be provided with a textured or divoted surface 26 to partially retain moisture within the system between floodings. Furthermore, a light opaque felt or plastic 28 having an opening 30 may be utilized to prevent light from reaching the root system of a growing plant as well as to inhibit moisture loss. The elongated members may also be hollow to reduce the cost of materials and/or to promote flexibility. In one embodiment the elongated members may also be telescopically received in one another.

Figure 2:
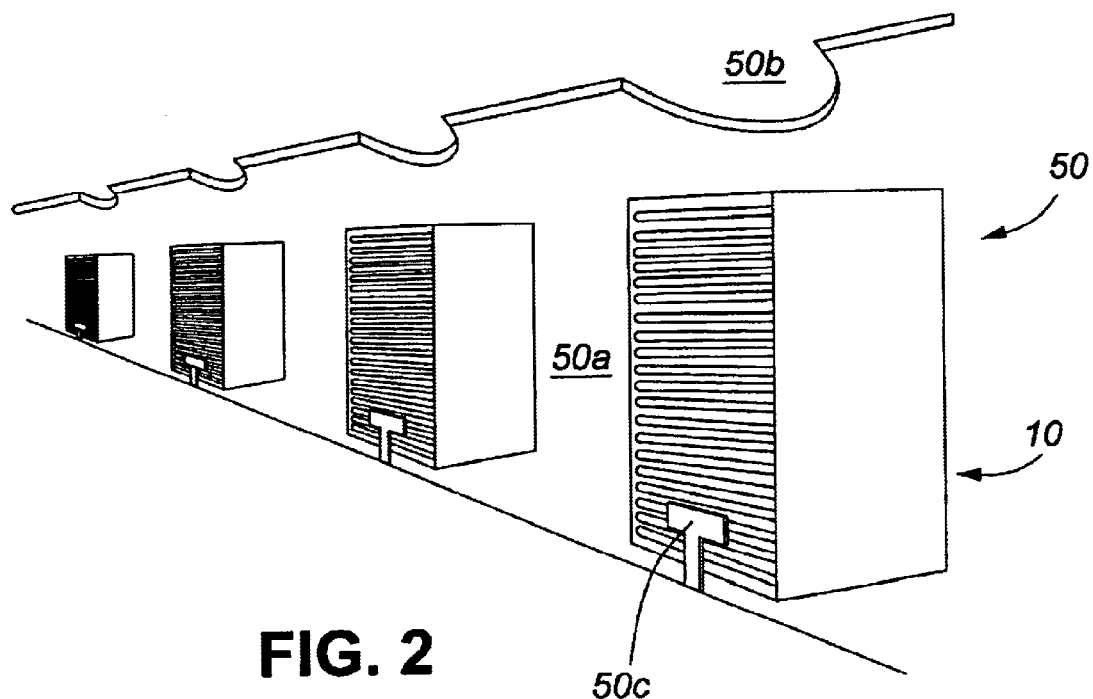
FIG. 2 is a perspective and cutaway view of the deployment of the PSS within an irrigation pipe in accordance with one embodiment the invention.
Figure 2A:
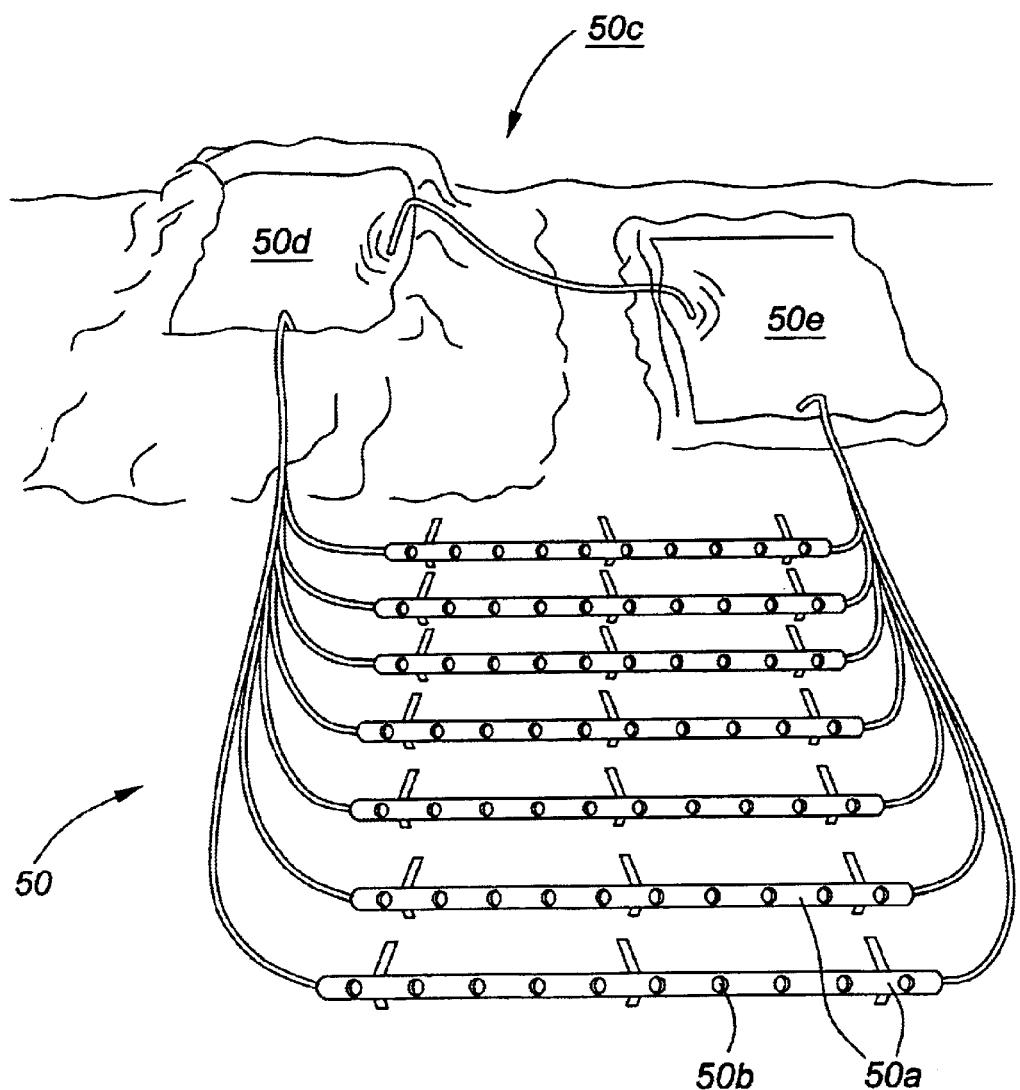
FIG. 2A is a perspective view of the deployment of the PSS showing a feed pond and catch pond in accordance with one embodiment of the invention.

With reference to FIGS. 2 and 2A, the PSS is preferably deployed within an irrigation and flooding system 50 for providing the nutrient solution to the PSS. In one embodiment, the irrigation and flooding system is a system of closed pipes 50a having openings 50b for placement of one or more PSSs within each pipe and for allowing plant growth to extend outside the pipe and light to reach the plant. The system of pipes 50a is connected to a nutrient solution source 50c which may include a feed pool 50d and a catch pool 50e. As a result, nutrient solution may be circulated through the pipes in such a way that a large number of PSSs supporting one or more plants each can be effectively flooded at regular intervals, thus creating a larger scale hydroponics operation. Circulation may be gravity fed or may be actively pumped, in each case allowing for recycling of water, fertilizer and nutrients.

The irrigation pipes 50a may include a lock-down system 50c at each opening 50b for securing a PSS at the opening 50b.

With reference to FIGS. 3, 3A, 3B and 3C, an alternate embodiment of the system of the frame and irrigation system is described. In this embodiment, the frame 12 includes a lower connection member 12g and the irrigation system includes panels 18 for operative and sealing engagement with the PSS panels 14a, 14b to retain nutrient solution within the PSS 10. Appropriate mounting systems 40 may be employed in addition to engagement/disengagement systems 42.

Figure 3B:
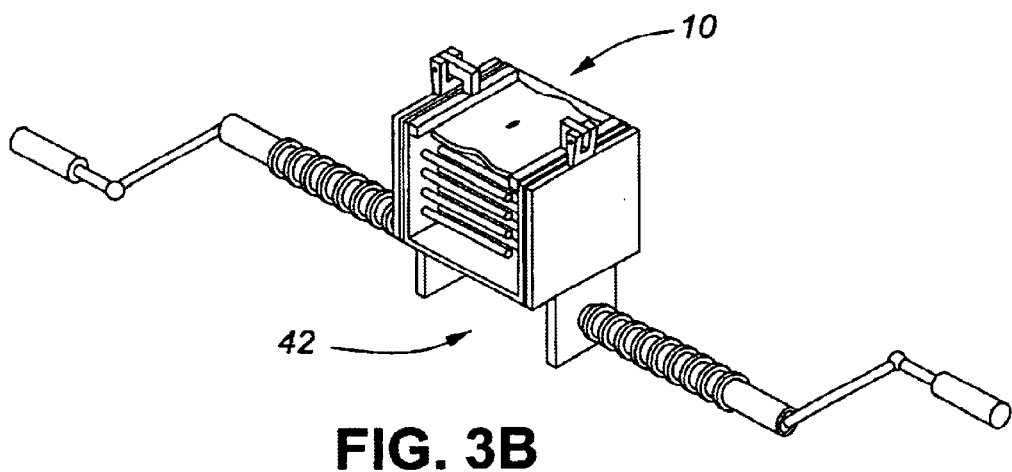
FIG. 3B is an assembled perspective view of a PSS of the embodiment of FIG. 3A.
Figure 3C:
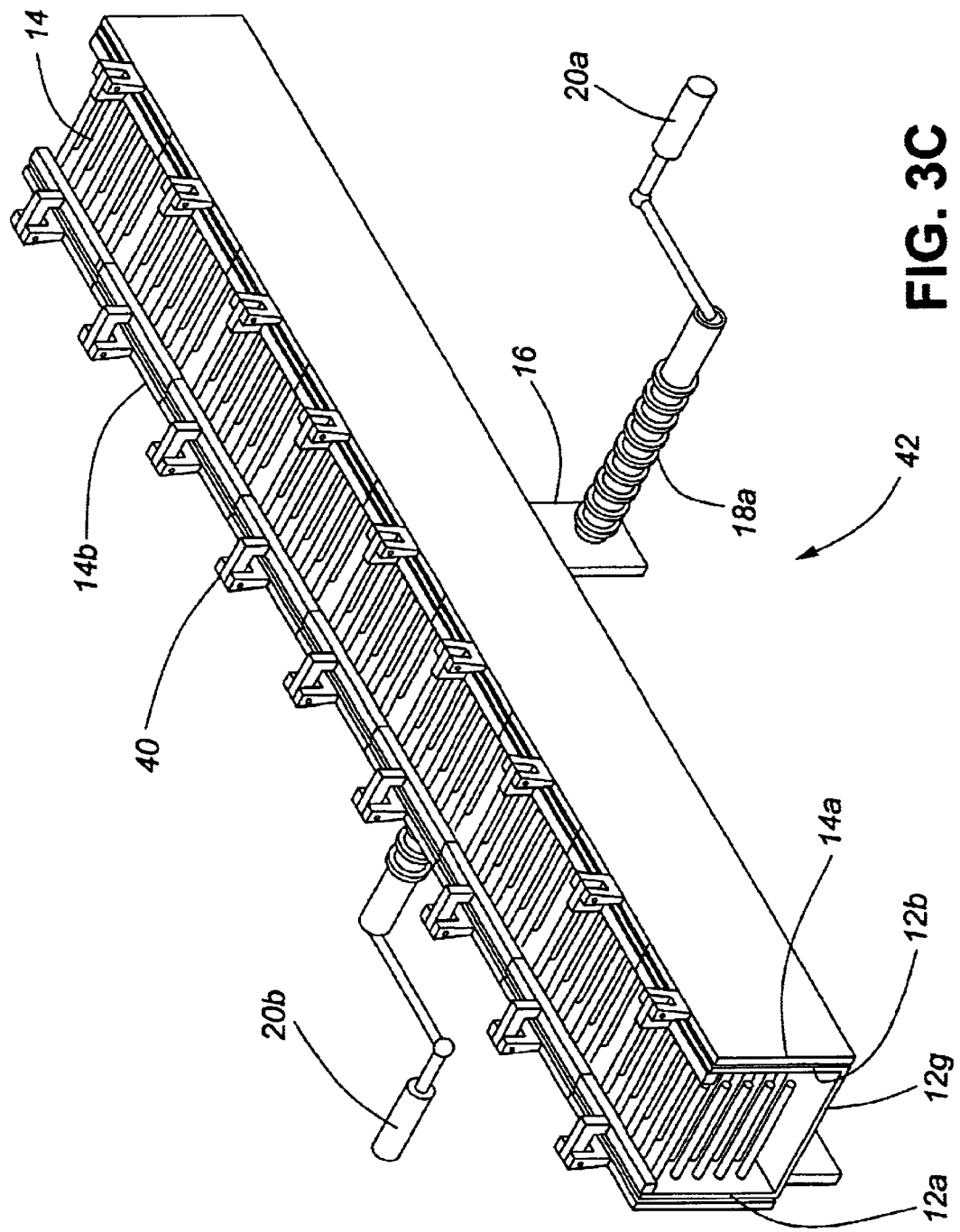
FIG. 3C is an assembled perspective view of a longer PSS of the embodiment of FIG. 3A.
Figure 4A:
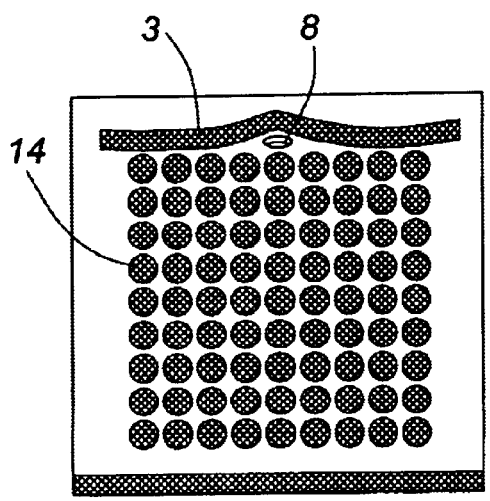
FIGS. 4A–4D are a cross-sectional views of the plant support media in accordance with the invention showing the germination and growth of a typical plant with FIGS. 4B and 4D showing the flooding phases.
Figure 4B:
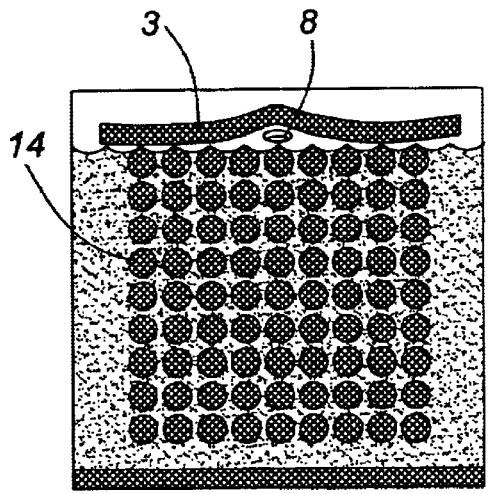
Figure 4C:
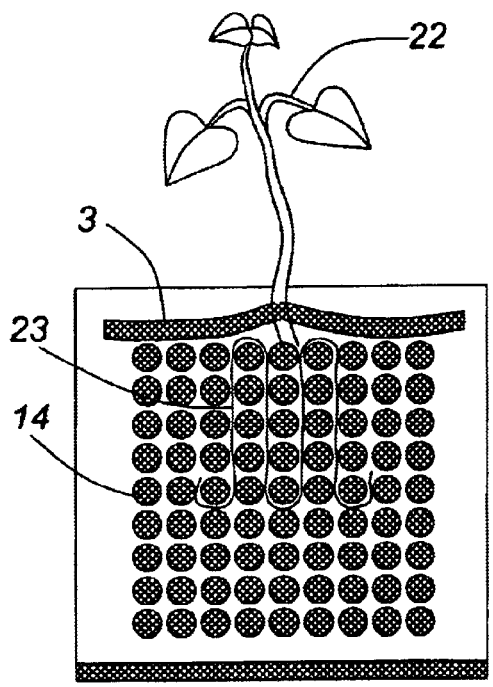
Figure 4D:
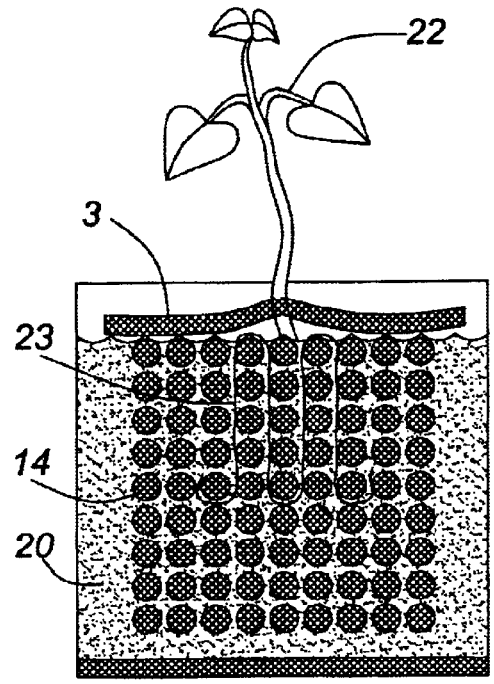

As shown in FIGS. 3A, 3B and 3C, the engagement/disengagement system 42 may include thread plates 16a, 16b and screws 18a, 18b configured to panels 14a, 14b so as to advance or retract panels 14a, 14b with respect to one another using crank arms 20a, 20b.

An example of the growth of a plant with the PSS is shown in FIGS. 4A, 4B, 4C, and 4D. As shown, a seed 8 is placed on the top of elongated members 14 and is optionally covered with a felt or other material 3 in order to prevent light penetration and/or minimize water evaporation.

Nutrient solution 20 (FIG. 4B) floods the PSS to a level wherein the seed 8 receives the moisture required to initiate germination. As the plant 22 germinates and grows (FIGS. 4C, 4D), the roots 23 propagate around the elongated members 14 bathing the roots with the nutrient solution during floodings.

EXAMPLES

Several tests of a PSS constructed of food grade acrylic as the support elongated members and plates have been undertaken resulting in successful germination and growth with repeated floodings of the PSS with water containing a basic organic (Liquid Kelp) fertilizer. Successfully grown plants include green beans, carrots and tomatoes. The elongated members' diameters have ranged from $\frac{1}{8}$" to $\frac{5}{8}$" and have also included hollow members in order to conserve material needed to construct larger members.

In a further experiment, a Bush Bean was grown in a PSS constructed of elongated members of black plastic. No cover was necessary to prevent light from hampering root growth. The bean was able to grow from seed to a plant with leaves in 6 days. It was then easily removed from the PSS, as the barrier walls were pulled apart and the elongated members were extruded through the barrier.

These trials demonstrate the viability of the PSS as system to grow different types of plants.

What is claimed is:

1. A plant growing system comprising:
   a first set of inherently-rigid elongated members extending outwardly from a support member, the elongated members having a fixed end attached to the support member and a free end; and
   a corresponding second set of inherently-rigid elongated members extending outwardly from a second support member, each of the elongated members of the second set having a fixed end attached to the second support member and a free end, the second set for overlapping and frictional interconnection with the first set, the first and second sets of elongated members for supporting a growing plant wherein the spacing between interconnected elongated members allows passage of a nutrient solution around interconnected elongated members and growth of the root system of the growing plant between and directly against the elongated members without soil.

2. A plant growing system as in claim 1 further comprising a frame for aligning the first and second sets of elongated members for interconnection.

3. A plant growing system as in claim 2 wherein the frame includes first and second sides having a plurality of openings for telescopically receiving individual elongated members of the first and second sets of elongated members.

4. A plant growing system as in claim 3 wherein the first and second sets of elongated members include at least one stop member to prevent removal of the first and second sets of elongated members from the frame.

5. A plant growing system as in claim 2 wherein the frame includes at least a first side having a plurality of openings for telescopically receiving individual elongated members of the first set of elongated members.

6. A plant growing system as in claim 5 wherein the openings are inwardly tapering.

7. A plant growing system as in claim 5 wherein the first and second sets of elongated members have a circular cross section.

8. A plant growing system as in claim 7 wherein the first and second sets of elongated members have a textured surface for retaining water.

9. A plant growing system as in claim 8 wherein the first and second sets of elongated members include at least one stop member to prevent removal of the first and second sets of elongated members from the frame.

10. A plant growing system as in claim 9 further comprising an irrigation system for supporting and flooding the elongated members with the nutrient solution.

11. A plant growing system as in claim 10 wherein the irrigation system includes at least one pipe having at least one opening for allowing light access to a growing plant on the elongated members.

12. A plant growing system as in claim 11 wherein the irrigation system includes a lock-down system for securing the elongated members to the inside of the at least one pipe.

13. A plant growing system as in claim 12 wherein the irrigation system includes a plurality of interconnected pipes.

14. A plant growing system as in claim 13 wherein the elongated members are a plastic suitable for growing a plant.

15. A plant growing system as in claim 14 wherein the elongated members are opaque.

16. A plant growing system as in claim 15 wherein the first and second sets of interconnected elongated members include a recess for receiving a seed, a plant or a second smaller system of interconnected elongated members.

17. A plant growing system as in claim 1 wherein the first and second sets of elongated members have a circular cross section.

18. A plant growing system as in claim 1 wherein the first and second sets of elongated members have a textured surface for retaining water.

19. A plant growing system as in claim 1 further comprising a screw system operatively connected to the first and second sets of elongated members for advancing or retracting the first and second sets of elongated members with respect to one another.

20. A plant growing system as in claim 1 wherein the first and second sets of interconnected elongated members include a recess for receiving a seed or plant cutting or a second smaller system of interconnected elongated members.

21. A plant growing system as in claim 1 further comprising an irrigation system for supporting and flooding the elongated members with the nutrient solution.

22. A plant growing system as in claim 21 wherein the irrigation system includes a plurality of interconnected pipes.

23. A plant growing system as in claim 21 wherein the irrigation system includes at least one pipe having at least one opening for allowing light access to a growing plant on the elongated members.

24. A plant growing system as in claim 23 wherein the irrigation system includes a lock-down system for securing the elongated members to the inside of the at least one pipe.

25. A plant growing system as in claim 1 wherein the elongated members are a plastic suitable for growing a plant.

26. A plant growing system as in claim 25 wherein the elongated members are opaque.

27. A method of growing and harvesting plants comprising the steps of:
　　placing a seed or a plant on or into elongated members of a plant growing system as defined in claim 1;
　　circulating a nutrient solution around the elongated members to promote plant growth;
　　opening the elongated members to remove grown plant material from the elongated members.

* * * * *